Sept. 23, 1958  J. GRILLO  2,853,040
AUTOMATIC DEGAUSSING SYSTEM
Filed Jan. 21, 1953  3 Sheets-Sheet 1

INVENTOR.
JOSEPH GRILLO
BY Frank A. Bower
ATTORNEY

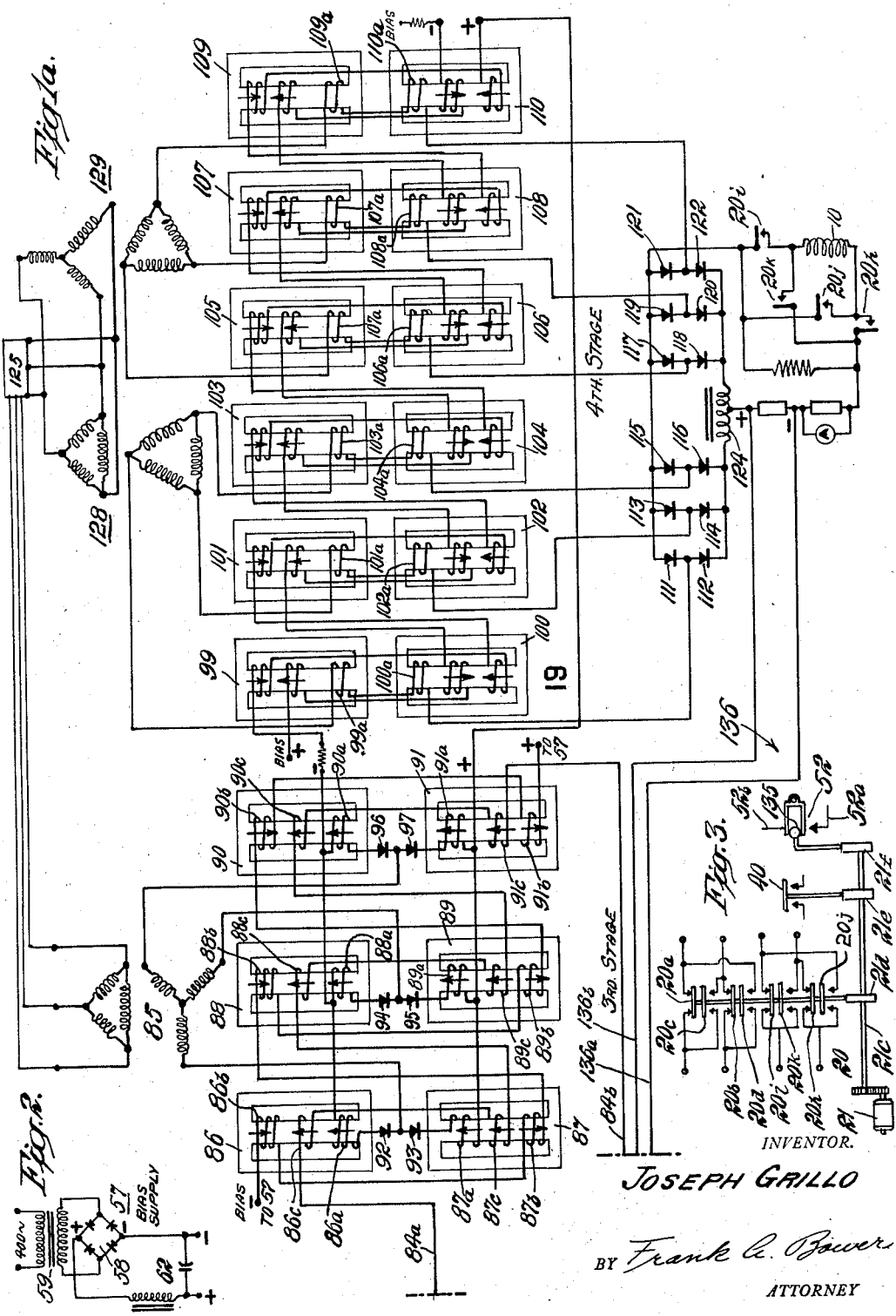

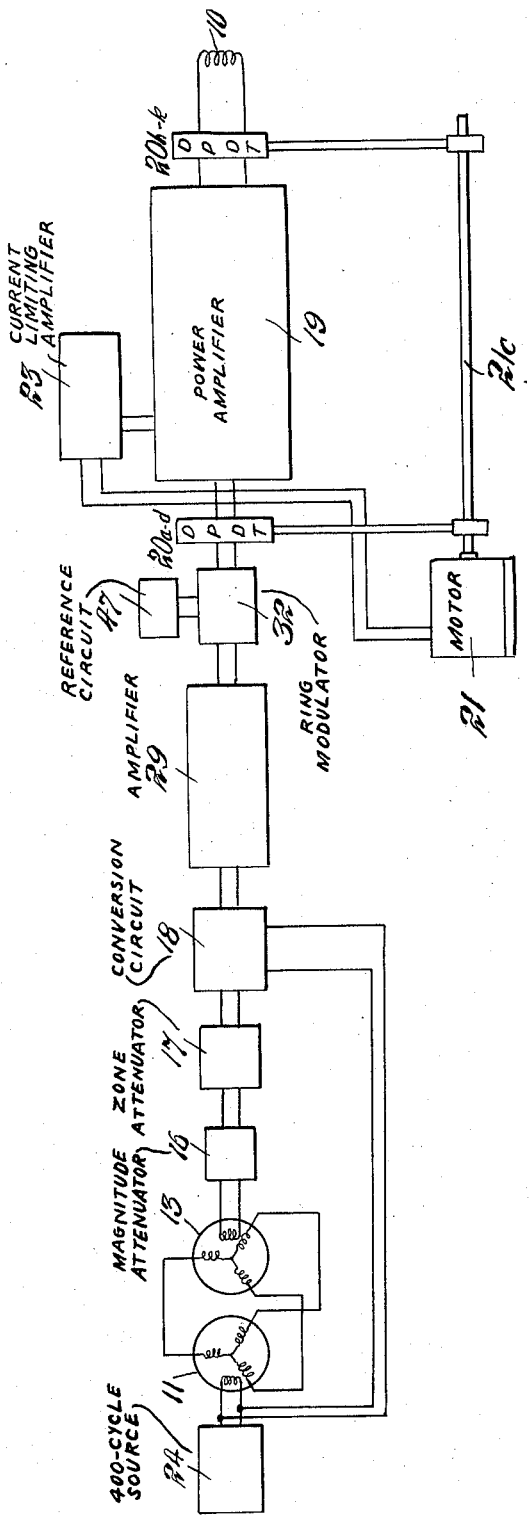

United States Patent Office 2,853,040
Patented Sept. 23, 1958

2,853,040

AUTOMATIC DEGAUSSING SYSTEM

Joseph Grillo, New York, N. Y., assignor to Ward Leonard Electric Company, a corporation of New York Application January 21, 1953, Serial No. 332,221

3 Claims. (Cl. 114—240)

This invention relates to an electrical system for degaussing or demagnetizing a ship and particularly relates to an electrical system that automatically degausses a ship in accordance with its magnetic heading.

The object of the invention is to provide an electrical system that supplies current to a ship's degaussing coil in accordance with the ship's heading. Another object is to provide an electrical system that supplies a current to the degaussing coils of a ship the magnitude of which varies in accordance with the departure of the ship from a given magnetic heading. Another object of the invention is to provide an electrical system that supplies to a degaussing coil of a ship a current to neutralize the magnetism of the ship due to the permanent magnetism of the ship and the magnetic heading of the ship.

Other and further objects and advantages will be understood from the following description taken in connection with the accompanying drawing in which:

Figs. 1 and 1a show a schematic diagram of an automatic degaussing system;

Fig. 2 shows a biasing circuit supplying the various biasing windings of the magnetic amplifier;

Fig. 3 shows a diagrammatic representation of the actuation of the switches; and Fig. 4 illustrates a block diagram of the apparatus.

Figure 1:
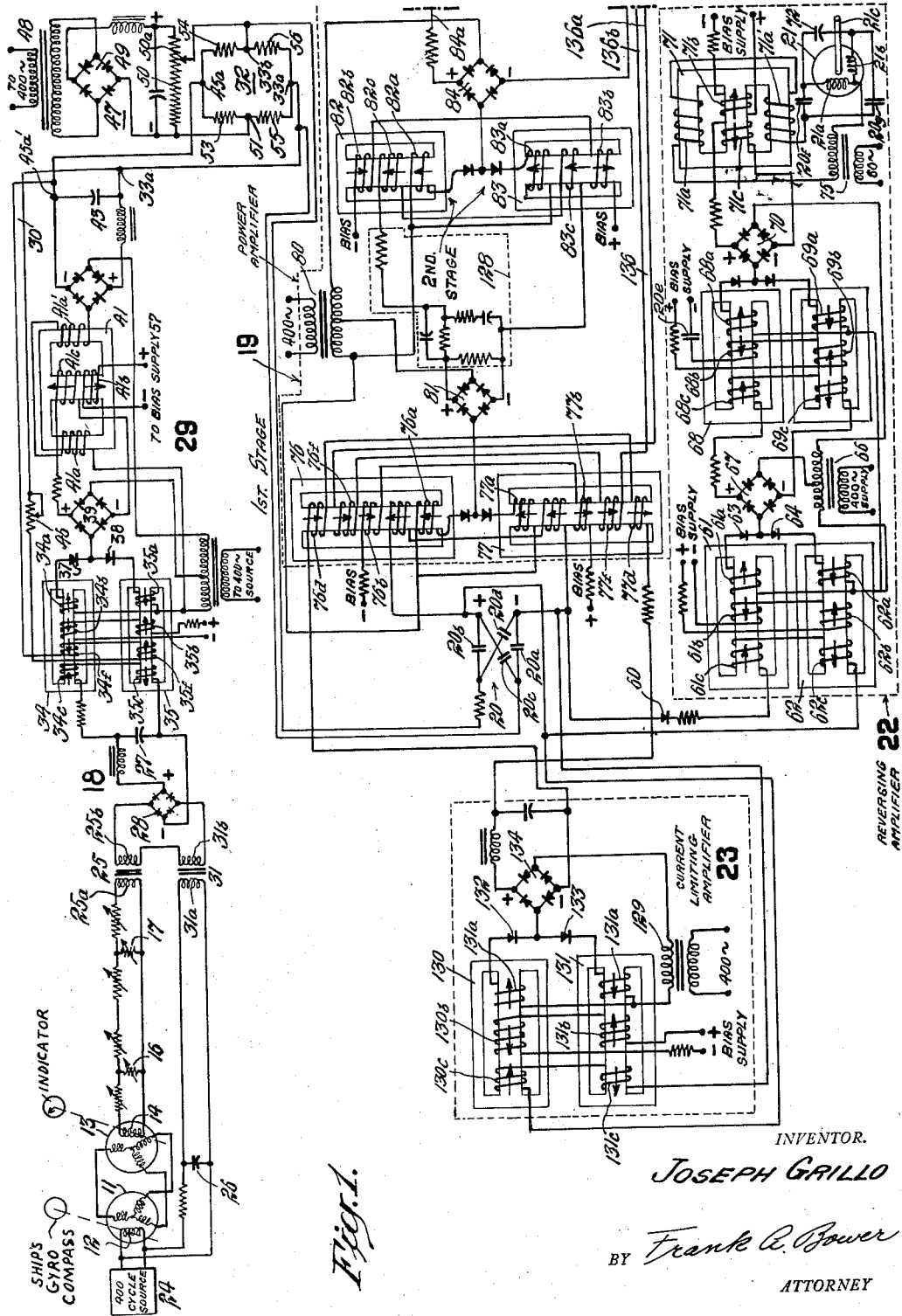

A plurality of degaussing coils are provided around a ship to reduce the magnetization of the ship to a negligible amount. The magnetization of a ship comprises a variable magnetization produced by the movement of the ship and a permanent magnetization of the ship. The permanent magnetization of the ship is constant and the correction determined and applied irrespective of the heading of the ship. The variable magnetization changes with the location of the ship on the earth's surface and the direction in which it is sailing. The compensation due to the geographical location of the ship also may be manually made from time to time as the ship passes from one zone to another. However, the magnetic field produced by the direction of travel changes more frequently with the changes of the ship's course. This invention is concerned particularly with a system that automatically corrects the magnitude and direction of the coil current with changes in the ship's heading. The current in each coil is controlled by a separate electrical system. Some of the coils are provided with a current that is a cosine function of the magnetic heading and other coils are provided with a current that has a sine function of the magnetic heading. The diagram in the accompanying drawing is for a single coil 10 and is capable of providing a current with a sine function or cosine function of the heading.

The sine or cosine function of the heading is obtained by electrically comparing the position of the rotor 12 of the synchro control transmitter 11 connected to the ship's gyro compass with the present position of the rotor 14 of the synchro control transformer 13. The rotor 14 is set in position to provide either a sine function or cosine function. The rotor 12 is connected to the ship's gyrocompass and as the course of the ship changes, the position of the rotor 12 changes. The rotor 12 is supplied with 400-cycle current. The difference in the settings between the two rotors is delivered as a current to the degaussing coil 10 to neutralize the magnetic effect amplified by the electrical system. The current or signal passes through a magnitude attenuator 16 and zone attenuator 17. Both reduce the current. The magnitude attenuator compensates for various characteristics of the ship and the zone attenuator provides a correction for the particular geographical location of the ship. The attenuators 16 and 17 feed the alternating signal to the conversion circuit 18 which converts it to an undulating direct current having a polarity and magnitude proportional to the function of the magnetic heading, either sine or cosine. The direct current is then amplified by a four-stage power amplifier 19 which has its output connected to the degaussing coil 10 and supplies the degaussing current thereto. The power amplifier can only amplify signals of one polarity. Therefore, in order to amplify both positive and negative signals the terminals connecting the conversion circuit to the amplifier input are crossed by the switch 20. The switch is actuated by the motor 21 and reversing amplifier 22. Also connected to the output of the conversion circuit 18 is a current limiting amplifier 23 which impresses a bias on the first stage of the power amplifier to limit the output of the amplifier to its rated output.

In the input circuit of the conversion circuit the course signal from the rotor 14 is added to an alternating reference signal from the 400-cycle source 24. The output of the zone attenuator 17 is connected across the primary winding 25a and the 400-cycle source is connected to the primary winding 31a through the phase shift network 26. The phase shift network is adjusted to synchronize the reference signal with the course signal so that the phase difference between the course signal and reference signal is either zero or 180°. The reference signal remains constant and the course signal varies in amplitude and in phase. The two signals are added in the secondaries 25b and 31b. Since the maximum amplitude of the reference signal is larger than the maximum amplitude of the course signal the resultant of the two signals is in phase with the reference signal and varies between a maximum and a minimum value. The resultant therefore has the same phase irrespective of the phase change of the course signal.

The signals are impressed across the full-wave bridge rectifier 28 and rectified to provide a direct current signal variable between a minimum and maximum voltage of the same polarity. The rectified output of the rectifier 28 is connected through a filter network 27 to a two-stage single-ended magnetic amplifier 29 with a negative feedback circuit 30.

The amplified direct current signal is combined in the ring modulator 32 with a direct current reference signal to provide an output direct current signal with a reversible polarity across the terminals 33a, 33b. The direct current reference signal has a value to effectively cancel the alternating reference signal thereby causing the polarity of the signal impression on the amplifier 19 to reverse in polarity with the reversal of the phase of the course signal and have a magnitude proportional to the amplitude of the course signal.

The amplifier 29 is a two-stage single-ended amplifier. The first stage has two three-legged saturable reactors 34 and 35 with anode windings 34a, 35a, control windings 34c, 35c, bias windings 34b, 35b and feedback windings 34f, 35f on the center legs. The anode windings 34a, 35a are supplied with 400-cycle current from the transformer 36. The rectifiers 37, 38 are connected in series with the windings 34a, 35a respectively to render the windings alternately conductive. The full-wave bridge rectifier 39 in the output of the reactors 34, 35 supplies the amplified signal to the second stage.

The second stage of the amplifier 29 comprises a saturable reactor 41 and a full-wave rectifier 42. The anode windings 41a and 41a' and the rectifier 42 are connected in series across the transformer 36 to provide a single-ended output. The saturable reactor may be of the shell type with the anode windings on the outer portion of the core. The bias winding 41b and control winding 41c are on the center core leg. The output of the rectifier is connected across ring modulator 32 through filter 43.

Either or both stages may be self-saturating, however in this embodiment the first stage is self-saturating and the second stage is not self-saturating. The negative feedback circuit is connected between the output terminal 33a, 45b and the feedback windings 34f, 35f. An adjustable resistor 46 is provided and is set to provide considerably negative feedback to produce linear operation of the amplifier within the signal range and eliminate drift due to heating, line voltage changes, rectifier aging, etc.

The biasing circuit 57 provides a direct current for the biasing windings of the various reactors and comprises a rectifier 58 connected to the 400-cycle power source 24 through the transformer 59. A filter network 62 smoothes out the rectified current passed to the bias windings.

The reference circuit 47 comprises a rectifier 49 and an input transformer 48 connecting rectifier 49 to the 400-cycle supply. The rectifier 49 provides a direct voltage larger than the direct reference voltage across the perm rheostat 50. The contact 50a on the rheostat may be adjusted to give a voltage greater than or smaller than the required direct reference voltage in order to allow for the permanent magnetization of the ship. This voltage is impressed across terminals 51, 33b.

The zero perm adjustment of the direct reference voltage is of such a value as to cancel the effect of the alternating reference voltage when combined with the amplifier output voltage in the ring modulator.

The ring modulator or bridge circuit comprises four resistors 53, 54, 55, 56 of equal resistance. The output or reversible direct voltage is taken from across the resistor 56.

If no perm allowance is required the contact 50a is adjusted so that when the signal output of control transformer 13 is zero, the output of the ring modulator is zero. When the phase of the course signal reverses with respect to the input signal, the polarity of the output of the ring modulator reverses.

The power amplifier 19 is single-ended and therefore only signals of the same polarity can be amplified. In order to amplify signals of different polarities the connections between the conversion circuit and the power amplifier are reversed by the contacts 20a, 20b, 20c, 20d of the switch 20 with a change in the polarity of the signal. Thus only one polarity is impressed on the amplifier 19. The switch 20 is connected to and turned by the motor 21. The reversing amplifier 22 is connected to the same side of the switch contacts 20a, 20b, 20c, 20d as the power amplifier so that the same signal is presented to the reversing amplifier that is presented to the power amplifier. A rectifier valve 60 is connected between the input of the reversing amplifier and the switches so that when a particular polarity appears across the terminals the reversing amplifier will be energized and the switch 20 operated. A voltage of the opposite polarity is not impressed on the reversing amplifier.

The reversing amplifier has three stages of amplification. The first stage comprises saturable reactors 61, 62 supplied with 400-cycle energy through the transformer 66. The reactors have anode windings 61a, 62a with rectifiers 63, 64 connected in series with anode windings 61a, 62a respectively to alternately pass the current through the anode windings. Bias windings 61b, 62b are connected to the bias circuit and control windings 61c, 62c are connected to the power amplifier input through the rectifier 60 and resistor 65 in series therewith. The full-wave rectifier converts the 400-cycle current to direct current and impresses it on control windings 68c', 69c' of the saturable reactors 68, 69 of the second stage. The second stage amplifier is similar to the first stage amplifier. The current in the bias windings 68b, 69b is such that at zero input signal the output of the amplifier is not sufficient to drive the motor. When the bias current is discontinued, the output of the amplifier increases to nearly maximum and the motor turns. The bias is removed by a cam-operated switch connected in series with the windings 68b, 69b. The motor remains at rest until the polarity changes. When a signal at the power amplifier changes polarity, the motor 21 is actuated since the switch 52 reverses the windings of the motor. The motor is actuated changing the connections of switch 20.

The switch 40 is normally closed and applies voltage from the bias circuit. Thus when the bias is removed from the second stage its output increases and the motor 21 will run irrespective of the input signal. The motor runs until it comes to rest at one extreme position or the other. When the motor reaches an extreme position, the contacts of the switch 52 change and the motor is in a condition to turn back. A cam which is actuated by motor 21 opens the contact 40 and holds it open until the motor is at rest in the opposite position. The rectifier 70 in the output of the second stage rectifies the amplified current and impresses it on the control winding 71c of the saturable reactor 71. The anode windings 71a, 71a' are connected at one end of the common point of the two field windings 21a, 21b of the two-phase motor 21. The other end of the anode windings is connected by the contacts 20f and 20g to the field windings 21a, 21b respectively. The capacitor 72 provides a phase shift between the currents in the field winding. The contacts 20f and 20g are never closed at the same time. Contact 20g runs the motor in one direction and contact 20f runs it in the opposite direction. Thus the contact 20g remains closed during rotation of the motor in one direction and remains closed until the switch 20 has reversed contacts; then control 20g is opened and 20f closed for rotation in the opposite direction. The contact 40 remains open during the rotation of the motor and closes at the same time or before the motor contacts 20f and 20g are opened and closed. This places a bias on the amplifiers 68, 69 which prevents the motor from reversing when it has reached its end of travel. The motor stops until another sequel of reversed polarity is impressed on the power amplifier. The last stage of the reversing amplifier is supplied with 60-cycle current through the transformer 75.

The switch 20 has contacts 20a, b, c, d connecting the conversion circuit 18 to the power amplifier 19 and the reversing amplifier 22 and contacts 20h, i, j, k connecting the amplifier to the coil 10. At the input of the power amplifier, 20c and 20d are open when contacts 20a and 20b are closed and contacts 20a and 20b are open when contacts 20c and 20d are closed. At the coil, contacts 20j and 20k are closed when contacts 20h and 20i are open and contacts 20h and 20i are closed when contacts 20j and 20k are open. Contacts 20j and 20k are closed when contacts 20a and 20b are open and contacts 20c and 20d are closed. Contacts 20h and 20i are closed when contacts 20a and 20b are closed and contacts 20c and 20d are open. Thus with a reversal of the connection of the conversion circuit to the power amplifier, the connection of the power amplifier with the coil 10 is reversed and a voltage applied to the coil is of the same polarity as if there was no switching. The contact 40 is closed when the motor is in either extreme position and open during a reversal of contacts.

There are several different conventional means by which the proper time of the actuation of the contacts may be accomplished. In Fig. 3 a schematic embodiment of one form is shown in which the motor 21 drives a shaft 21c through an arc of less than 360°. The switches 20a–j are actuated by cam 21d which at one end of the arc of travel raises the contacts so that contacts 20a, b, h, i are closed and at the other end of the arc of contact lowers the contacts so that contacts 20c, d, k, j are closed. Cam 21e opens the switch 40 during the arc of travel and closes it at each end. The switch 52 is actuated by cam 21f through the dog 135. The dog 135 is engaged at each end of the arc of travel and holds either contact 52a or 52b closed during the arc of travel. At the end of the arc of travel the dog is actuated to open one contact and close the other contact so that the motor will be electrically connected to turn in the opposite direction.

The power amplifier is a single-ended amplifier and in the embodiment shown it has four stages with a negative feedback circuit 136 from the output of the last stage back to the input of the first stage.

The first stage comprises saturable reactors 76, 77 with two anode windings 76a, 77a supplied with 400 cycle current through the transformer 80. Rectifiers 78 and 79 are connected in series with the anode windings 76a, 77a respectively to alternately render the anode windings conductive. The full-wave bridge rectifier 81 in the output supplies a direct current to the next stage. The anode windings, bias windings, control windings, feedback windings and current limiting windings are all wound on the center legs. The bias windings of the reactors are connected to the bias supply through the transformer 80. The current limiting amplifier is connected to the current limiting windings 76d, 77d.

The second stage is similar with saturable reactors 82, 83 having anode windings 82a, 83a, control windings 82c, 83c and bias windings 82b and 83b on the middle legs. The full-wave rectifier 84 feeds direct current to the control windings of the third stage.

The third and fourth stages are three-phase circuits and are connected to the power sources by three-phase transformers. The third stage is connected by the transformer 85 to the three-phase 400-cycle source 24. The primary is connected in a delta arrangement to the source 24 and the secondary winding is connected in a Y arrangement to six saturable reactors 86 to 91. The reactors are grouped in pairs with each pair connected to a leg of the secondary winding. The reactors of each pair are connected in parallel and alternately pass the current. The anode windings 86a, 87a are connected in series with the rectifiers 92, 93 to alternately pass a direct current to the control windings of the fourth stage. The anode windings 88a, 89a are similarly connected to rectifiers 94, 95 and anode windings 90a, 91a to rectifiers 96, 97. This provides the control windings of the fourth stage with substantially smooth control current. The bias windings 86b to 91b are connected in series across the bias supply circuit 57 and the control windings 86c to 91c are connected across the output rectifier 84 of the second stage. The bias current is adjusted to place the reactors 86 to 91 in the desired operating range so as to operate on the linear portion of their characteristic curve.

In the fourth stage there are twelve saturable reactors 99 to 110 connected in pairs. Three pairs comprising reactors 99 to 104 are connected by a three-phase transformer 128 with a delta-delta arrangement to the three-phase 60-cycle source 125, and the other three pairs comprising reactors 104 to 110 are connected by the three-phase transformer 129 with a Y-delta arrangement to the source 125. The anode windings of each pair are connected in series. The anode windings 99a, 100a are connected to the rectifiers 111, 112; windings 101a, 102a to rectifiers 113, 114; windings 103a, 104a to rectifiers 115, 116; windings 105a, 106a to rectifiers 117, 118; windings 107a, 108a to rectifiers 119, 120 and 109a, 110a to rectifiers 121, 122. The rectifiers alternately pass the current from the respective pair of anode windings to impress a substantially constant direct current on the coil 10. The interphase reactor 124 interconnects the first set of rectifiers and the second set of rectifiers and distributes the load current between the two channels. Resistor 15 keeps a load on the amplifier during reversing.

The first three stages of the power amplifier are self-saturating and operate on the linear portion of their characteristic curve. On a zero signal the third stage has an output current. The saturable reactors of the fourth stage are biased on the series bias windings 99b to 110b to cancel this output and maintain the output current of the fourth stage at substantially zero on a zero signal. The two three-phase channels with the delta-delta transformer arrangement and Y-delta transformer arrangement reduce the ripple in the output current to narrow limits and provide the load coil 10 with a substantial constant demagnetizing current.

A compensation network is connected between the rectifier 81 and the control windings 82c, 83c for stabilizing the operation of the power amplifier. A current limiting amplifier 23 is provided to limit the output of the power amplifier to a maximum prescribed value when the sum of effects due to heading and perm exceed this maximum value.

The current limiting amplifier 23 comprises saturable reactors 130, 131 with control windings 130c, 131c connected in parallel with the input of the power amplifier. The anode windings 130a, 130a' are supplied with a 400-cycle current through the transformer 129. The rectifiers 132 and 133 are connected in series with the anode windings respectively to alternately supply the anode windings with 400-cycle current. The rectifier 134 impresses a direct current on the current limiting windings 76d and 77d to limit the output of the power amplifier to its rated output. The bias windings 130b, 131b impress a bias on the limiting amplifier which maintains the output of the amplifier negligible until the current impressed on the power amplifier is large enough to cause an output above the rated output. The output of the current limiting amplifier increases rapidly to balance the excess signal. When the voltage is at a value to give the maximum magnetization current in the output of the power amplifier, further increases in the signal will be matched by a corresponding increase in the output of the current limiting amplifier. This increase cancels the signal increase and thus maintains the power amplifier at the maximum output.

The saturable reactors have been as shown for purposes of simplicity of representation of the circuit. The reactors may be of any conventional type. For the purposes of this description a rectangular three-legged type of core has been used. All windings on all reactors except 41, 71 are on the center legs of the reactors. The rectifiers in series with the anode windings are arranged to pass the anode current alternately through one winding then the other.

The reactors 41 and 71 each have two anode windings connected in series on the outer legs of the core and the bias and control windings on the center leg. The reactors 86 to 91 and 99 to 110 have single anode windings which are wound on the center leg of the core with the bias and control windings. The reactors 86 to 91 have rectifiers 92 and 97 in series with a respective winding to alternately pass the output current.

Although a particular embodiment has been shown and described, various modifications and changes may be made without departing from the scope of the invention.

I claim:

1. An automatic degaussing system for supplying a current to a degaussing coil of a ship from an alternating source comprising a control circuit connected to said source for producing an alternating signal having a phase and a magnitude variable in accordance with the magnetic heading of the ship, a conversion circuit for combining said alternating signal with a reference alternating current signal from said source to produce an undulating direct current signal of a single polarity and variable in magnitude in response to changes in magnitude of the alternating signal, means for combining said direct current signal with a constant reference direct current signal to produce a second direct current signal having a polarity with respect to the constant reference direct current signal that is reversible with the phase of said alternating signal and with a value proportional to the magnitude of the alternating signal, a single-ended power amplifier for amplifying said direct current signal and supplying a current to said coil, and switching means connected to and commonly actuating the input and output of the power amplifier for reversing the input and output terminals on a change in polarity of the direct current signal.

2. An automatic degaussing system as set forth in claim 1 wherein there is provided a reversing circuit connected to the output of the conversion circuit with blocking means between the reversing circuit and the combining means to pass only signals of one polarity, and means actuated by said reversing circuit connected to said switching means to switch connections when the direct control signal has a particular polarity.

3. An automatic degaussing system as set forth in claim 1 wherein a current limiting means is connected to the input of said power amplifier to limit the output of said power amplifier to the maximum desired value.

References Cited in the file of this patent

UNITED STATES PATENTS

| | | |
|---|---|---|
| 2,412,617 | Jenkins | Dec. 17, 1946 |
| 2,421,583 | Stuart | June 3, 1947 |
| 2,519,395 | Perlow et al. | Aug. 22, 1950 |
| 2,541,093 | Page | Feb. 13, 1951 |
| 2,718,205 | Gebs et al. | Sept. 20, 1955 |
| 2,730,063 | Gebs et al. | Jan. 10, 1956 |

FOREIGN PATENTS

| | | |
|---|---|---|
| 592,766 | Great Britain | Sept. 29, 1947 |